US009926069B2

(12) United States Patent
Havar et al.

(10) Patent No.: US 9,926,069 B2
(45) Date of Patent: Mar. 27, 2018

(54) LOAD-BEARING FAIRING ELEMENT FOR A FLAP ADJUSTMENT MECHANISM AND AIRCRAFT HAVING SUCH A FAIRING ELEMENT

(71) Applicant: Airbus Operations GmbH, Hamburg (DE)

(72) Inventors: Tamas Havar, Bruckmuehl (DE); Mirko Missbach, Bremen (DE); Wolfgang Machunze, Hoehenkirchen (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 78 days.

(21) Appl. No.: 14/713,089

(22) Filed: May 15, 2015

(65) Prior Publication Data

US 2015/0329198 A1 Nov. 19, 2015
US 2017/0247104 A2 Aug. 31, 2017

(30) Foreign Application Priority Data

May 16, 2014 (DE) .................. 10 2014 106 930

(51) Int. Cl.
*B64C 9/22* (2006.01)

(52) U.S. Cl.
CPC ..................... *B64C 9/22* (2013.01)

(58) Field of Classification Search
CPC .... B64C 7/00; B64C 9/16; B64C 9/22; B64C 9/02; B64C 5/08; B64C 13/00;
(Continued)

(56) References Cited

U.S. PATENT DOCUMENTS 5,230,487 A * 7/1993 Gartelmann .............. B64C 9/16
244/216
6,719,870 B2 * 4/2004 Ludin ..................... B29C 70/46
156/293
(Continued)

FOREIGN PATENT DOCUMENTS

DE 4107566 C1 9/1992
DE 102007048449 A1 4/2009
(Continued)

OTHER PUBLICATIONS

European Patent Office, European Search Report for European Patent Application No. 15 16 7559 dated Oct. 9, 2015.
(Continued)

*Primary Examiner* — Medhat Badawi
*Assistant Examiner* — Vincente Rodriguez
(74) *Attorney, Agent, or Firm* — Lorenz & Kopf, LLP (57) ABSTRACT

A load-bearing fairing element for a flap adjustment mechanism of an aircraft comprises a shell-shaped fairing housing with an at least partly U-shaped profile with an open side, a closed side, and a direction of main extension, at least one first cover panel that along the direction of main extension covers part of the open side, and a load-bearing bridge element. The bridge element is arranged in the fairing housing and with a base area conforms so as to be flush against an internal surface of the fairing housing and extends towards the open side. The bridge element comprises an essentially planar cover area that covers the base area on the open side in order to produce a closed profile contour that is circumferential on the direction of main extension. The bridge element comprises means for holding a shaft feed-in of a central flap drive and means for holding an adjustment mechanism that is couplable to the shaft feed-in. Conse-
(Continued)

quently there is no need to provide complex stiffening structures within the fairing element.

14 Claims, 3 Drawing Sheets

(58) Field of Classification Search
CPC .... B64C 3/30; B64C 3/36; B64C 3/50; B64C 21/00; B64C 27/00; Y02T 50/44; B60P 1/00; B64D 1/04; F41F 5/02; B60K 2001/0494
USPC .................................................. 244/215, 213
See application file for complete search history.

(56) References Cited

U.S. PATENT DOCUMENTS

| | | | | |
|---|---|---|---|---|
| 6,802,170 B2* | 10/2004 | Davis | ........................ | E04C 3/07 29/897.31 |
| 7,798,450 B2* | 9/2010 | Patzelt | ...................... | B64C 3/50 244/211 |
| 9,227,722 B2* | 1/2016 | Soenarjo | ................... | B64C 9/16 |
| 2005/0082434 A1* | 4/2005 | Stephan | ................... | B64C 9/16 244/131 |
| 2009/0127403 A1* | 5/2009 | Perez-Sanchez | ......... | B64C 9/16 244/213 |
| 2013/0087662 A1 | 4/2013 | Soenarjo | | |

FOREIGN PATENT DOCUMENTS

| | | |
|---|---|---|
| EP | 0303458 A2 | 2/1989 |
| EP | 0356142 A2 | 2/1990 |
| EP | 2048077 A2 | 4/2009 |
| WO | 03035469 A1 | 5/2003 |
| WO | 2005021375 A1 | 3/2005 |
| WO | 2008009988 A2 | 1/2008 |

OTHER PUBLICATIONS

German Patent Office, German Search Report for European Patent Application No. 10 2014 106 930.7 dated Nov. 26, 2014.

* cited by examiner

LOAD-BEARING FAIRING ELEMENT FOR A FLAP ADJUSTMENT MECHANISM AND AIRCRAFT HAVING SUCH A FAIRING ELEMENT

CROSS-REFERENCE TO RELATED APPLICATIONS

This application claims priority to German Patent Application No. 10 2014 106 930.7, filed May 16, 2014, which is incorporated herein by reference in its entirety.

TECHNICAL FIELD

The embodiments relate to a load-bearing fairing element for a flap adjustment mechanism of an aircraft and to an aircraft comprising at least one adjustable flap, a flap adjustment mechanism coupled thereto, and a load-bearing fairing element.

BACKGROUND

For the purpose of controlling flight, aircraft usually comprise adjustable flaps that are rotatorily and/or translatorily moved by way of actuators. In particular, high-lift flaps carry out a very substantial translatory and at the same time rotatory movement relative to the wing. The adjustment mechanism used for this is frequently driven by a central power control unit in the region of a wing root, which power control unit is coupled, by way of a gear shaft, to the adjustment mechanism. Often, spindle gear arrangements are used in the adjustment mechanism, in that spindle gear arrangements a driven rotary spindle engages a spindle nut and slides this spindle nut along the longitudinal axis of the spindle. Because of its size, the adjustment mechanism often projects beyond the underside of the wing on that the adjustable flap is arranged, and is aerodynamically enclosed by a fairing element.

Such a fairing element is, for example, known from DE 10 2007 048 449 A1, which comprises a load-bearing structure with a multitude of separately manufactured stiffening elements that fulfill a load-bearing function for the adjustment mechanism.

In addition, other objects, desirable features and characteristics will become apparent from the subsequent summary and detailed description, and the appended claims, taken in conjunction with the accompanying drawings and this background.

SUMMARY

The integration of a multitude of stiffening elements in a fairing element and the placement of mechanical components for the adjustment mechanism result in costly and elaborate manufacture. Individual stiffening elements need to be produced separately and need to be individually connected to a shell-like, aerodynamically shaped element in order to in this manner construct a load-bearing fairing element.

It is an object of the embodiment to propose a fairing element that may be manufactured particularly economically without there being a need to do without the positive aerodynamic characteristics, a lightweight construction, or the load-bearing function.

This object is met by a fairing element with the characteristics of the independent claim 1. Advantageous embodiments and improvements are stated in the subordinate claims and in the following description.

Proposed is a load-bearing fairing element for a flap adjustment mechanism of an aircraft. The fairing element comprises a shell-shaped fairing housing with an at least partly U-shaped profile with an open side, a closed side and a direction of main extension; at least one first cover panel that along the direction of main extension covers part of the open side; and a load-bearing bridge element, wherein the bridge element is arranged in a second section of the direction of main extension in the fairing housing, with a base area conforms so as to be flush against an internal surface of the fairing housing and extends towards the open side, and an essentially planar cover area that covers the base area on the open side in order to produce a closed profile contour that is circumferential on the direction of main extension. The bridge element comprises means for holding a shaft feed-in of a central flap drive and means for holding an adjustment mechanism that is couplable to the shaft feed-in.

The shell-shaped fairing housing provides the outer shape that, in particular, determines the aerodynamic characteristics of the fairing. The extension of the fairing housing is determined by the size of the adjustment mechanism; according to the extension the fairing can be a housing closed off per se or it can form part of a larger housing. In particular, a further housing part may be arranged on the high-lift flap to be moved, which high lift flap carries out a translatory and/or a rotatory movement. So as not to impede this, the fairing housing is pivotally coupled to another fairing housing so as not to impede this pivoting movement of the adjustment mechanism. To be able to provide as free and flexible a shape as possible, manufacturing the fairing housing in particular from a fiber composite material suggests itself.

The profile of the fairing housing at least in parts comprises a U-shape, wherein the limbs of the U-profile form the lateral walls, and the arc extending between the limbs establishes an aerodynamically advantageous transition between the lateral walls. In actual fact the term "U-profile" is not to be narrowly interpreted as having two limbs that extend exactly parallel to each other. Instead, the term "U-profile" refers to a rounded, preferably symmetrical and geometrically in particular simple profile that on one side is closed by a type or arc, and on the other side is open so that in this manner a fairing housing is implemented that is open on one side and is overall shell-shaped.

Since such fairing elements usually comprise an elongated structure, the direction of main extension of the fairing element may be a longitudinal axis of the fairing element. The fairing housing can be divided into several imaginary sections that are strung together in the direction of main extension. The axis of main extension may, in particular, be a longitudinal axis because the fairing housing is usually elongated in shape and is aligned parallel to the expected direction of flow.

The first cover panel is used as a thrust plate; it contributes to the provision of adequate stiffness of the fairing housing, in particular in terms of torsion loads and bending loads. It is thus necessary for a fixed connection on the edge to exist between the first cover panel and the fairing housing. To this effect strip-like flanges that extend perpendicularly to the first cover panel suggest themselves, which flanges make it possible to bond or rivet the first cover panel to the fairing housing with the use of adequate surface contact.

For the load-bearing fairing element the bridge element acts as a multifunctional connecting link between a wing, a shaft feed-in and an adjustment mechanism for a flap and is integrated as a compact unit in the fairing element. By carrying out several tasks the bridge element may act as a central load introduction element for the adjustment mechanism. In terms of materials characteristics, the bridge element may be separately adapted to absorb the loads that arise in the interaction between the controlled flap, the wing, and the fairing element, and may introduce these loads into the fairing housing, in particular through a boundary surface between the base area of the bridge element and the internal surface of the fairing housing. The circumferential closed profile contour supports the inherent strength of the bridge element and moreover by way of the planar cover area allows simple attachment to a wing. However, this need not be the only attachment; in addition, further regions of the fairing element is connectable to the wing.

A core aspect of the embodiment thus consists of the separation of functions for the structural stiffening of a fairing housing and of functions that relate to the load introduction or the load absorption in conjunction with the adjustment mechanism of the associated flap. While consequently the bridge element integrated in the structurally-stiffened fairing housing may be ideally adapted to the load introduction, the fairing housing per se is independent of this task and may consequently also be manufactured independently hereof in a significantly simpler manufacturing process. In particular, this makes possible the manufacture with the use of an adapted material, for example a fiber composite material, in a comparatively simple work process.

In a particularly advantageous embodiment the fairing housing is made from a fiber composite material and comprises at least one integral stiffening component. A fiber composite material supports a particularly flexible design, wherein already during the manufacturing process all the stiffening components necessary to ensure rigidity of the fairing housing may be directly integrated. The separate placement of, in particular, metallic, sheet-metal-like components may thus be avoided. A stiffening component may, for example, be a rib, a frame element, a stringer, or a combination thereof. Of course, a stiffening component in a region where the expected mechanical tension is relatively low may also comprise a recess in order to save weight.

Preferably, the fairing housing furthermore comprises at least one connection means that is designed to establish a mechanical connection with a wing. A connection means may be made available in the form of a separately provided component that comprises a flange or an aperture, so that by way of mechanical connecting elements, adhesive or the like a mechanical connection with a wing may be established. In this arrangement the connection means should be reachable from the open side of the fairing housing. The connection means may, however, also be integrated in an already provided stiffening component, or may be integrated in the fairing housing as a separate component.

In an advantageous embodiment the fairing housing, in a region close to the leading edge of the fairing element, comprises a multitude of ribs that are spaced apart from each other, which ribs are arranged transversely to the direction of main extension. The term "ribs" refers to flat components that from the closed side of the fairing housing extend at least in part towards the open side and comprise a through opening or a surface comprising an opening so that stiffening of this region takes place. In the manufacture of the fairing element the ribs may be produced in the form of pre-compacted or pre-cured composite structures and during the process of curing of the fairing housing may be cured together with the fairing housing. Prior to curing, transitions between the internal surface of the fairing housing and the pre-cured or pre-compacted composite structures situated thereon may be lined with the use of widths comprising a resin-impregnated fiber fabric. As a result of the integration of the ribs in one work step with the manufacture of the fairing housing, an integral component of particularly light weight and with a stiffness specially tailored to the stress to which it will be subjected may be manufactured.

The above-mentioned connection means may, for example, be integrated in one or several of these ribs in order to establish a connection between a wing and an end of a rib, which end faces the open side of the fairing housing. The rib, in which a connection means is integrated, may have a dimension that differs from that of the other ribs, and may, for example, extend further towards the open side of the fairing housing than is the case with adjacent ribs. On the other hand, several or all the ribs may comprise this connection means. Apart from the attachment to the cover area of the bridge element this allows additional securing of the leading edge of the fairing element to the wing.

On its internal surface the fairing housing preferably comprises a load introduction region in which the bridge element is integrally connected to the fairing housing. To this effect, apart from the mutual adaptation of the base area of the bridge element and the internal surface of the fairing housing, the placement of an adhesive or resin may take place so that, after corresponding curing, a solid connection between the fairing housing and the bridge element is present. During the curing process of the fairing housing the bridge element may be positioned therein and, as a result of the curing of the resin from the fiber composite material, may be connected to the fairing housing during curing. Consequently, this obviates the need, in particular, of any subsequent processing of the boundary surface between the bridge element and the fairing housing.

The load introduction region may be delimited in at least one direction along the direction of main extension by means of at least one flat flange. The aforesaid may be implemented in the form of a rib or of a frame element that apart from circumferential stiffening also provides means for attaching the bridge element.

If attachment of the bridge element is to take place after the process of curing of the fairing housing, the surface of the load introduction region and the base area may be provided with a desired surface roughness and/or a desired fit with the use of a grinding process or some other material-removing processes so that the bridge element may be securely connected to the fairing housing.

As an alternative or in addition to the aforesaid, the bridge element may comprise at least one connecting region that corresponds to a connecting region of the fairing housing, wherein the connecting regions are matched in such a manner that positive-locking or non-positive-locking connecting elements may be used to connect them. Consequently, the bridge element may be connected to the fairing housing with the use of screw connections or rivet connections. The connecting regions may, in particular, comprise strip-shaped surface regions or flanges, which are preferably circumferential around the direction of extension, and/or extend along the direction of extension, so that, for example rivets or screws may be used in dedicated connection regions that overlap each other.

In a particularly advantageous embodiment the bridge element has been manufactured from a metallic material. This may, in particular, comprise an aluminum alloy, magnesium alloy or titanium, which is, in particular, tailored to the stress to which it will be subjected, so that adequate strength and at the same time the lightest possible weight result. In this embodiment the design of the bridge element may include the separate manufacture of individual components and their joining by conventional joining techniques. However, it would also be imaginable to manufacture more complex and weight-optimized structures in a layered construction process, which structures form a bridge element. The material-removing processing of a solid metal block and the casting of the bridge element are further imaginable variants.

Particularly advantageously, the fairing element comprises a second cover panel, arranged along the direction of main extension on an end of the bridge element, which end is opposite the first cover panel. The second cover panel also acts as a thrust plate and contributes to the stiffness of the region of the fairing housing, which region is covered by the second cover panel.

Each of the above-mentioned cover panels may also be made of a metallic material, which may be integrated in the fairing housing by means of riveting, bonding, or mutual curing. Of course, it would also be imaginable to produce the cover panels from a fiber composite material, both as integral components and as separately manufactured and attachable components.

It is advantageous to integrate at least one access opening in the fairing housing that is dimensioned in such a manner that a human hand may reach through the access opening into the interior of the fairing housing in order to access components located in the fairing housing. It is thus easily possible for a person to inspect the interior of the fairing element, to carry out maintenance work, or to support the installation of components. In order to preserve the aerodynamically favorable characteristics, the at least one access opening should be designed so as to be closable with the use of a cover, wherein due to the expected flow speeds the cover is preferably screwed to the fairing housing.

In a particularly advantageous embodiment at least one of the at least one access opening in the fairing housing is aligned with an access opening in the bridge element. This makes it possible to access from the outside components that are arranged in the bridge element, for example components of a flap adjustment mechanism. The bridge element may consequently comprise a configuration that cannot, or need not, subsequently be taken apart. In addition, the bridge element may thus also act as an integral stiffening device of the fairing housing in the region around the access holes.

Particularly preferably, on each of the two lateral surfaces the fairing element comprises at least one access opening, wherein these access openings may be arranged symmetrically or so as to correspond to each other. In particular for installation and maintenance, access on both sides is possible.

In a particularly preferable embodiment at least one of the at least one access opening comprises an annular thickening on the edge. This is used as a mechanical reinforcement in order to prevent stress peaks in the edge region, which stress peaks may result in damage to the fairing housing when the latter is subject to mechanical loads.

Further advantageously, the bridge element comprises an annular thickening in a region in that access opening of the fairing housing is situated, in order to be integrated in the bridge element as additional reinforcement. This obviates the need for producing an additional, possibly multi-layer, laminate construction on the fairing housing, without however compromising the mechanical integrity of the fairing housing.

Furthermore, the embodiment relates to an aircraft comprising a wing and at least one flap arranged so as to be movable relative to the wing, further comprising at least one adjustment mechanism that is arranged in an above-mentioned fairing element that is attached to the wing.

Manufacture of the fairing element may be ensured by means of a special production process that is briefly stated below. The method for manufacturing a fairing element may be implemented in various ways. They differ, in particular, by the selected concept of curing, pre-curing or pre-compacting of one or several sub-regions of the fairing housing or of the fairing element. Proposed is a basic method that comprises the steps of providing a shell-shaped fairing housing, at least one first cover panel and a bridge element, and the joining and connecting of these components. In a preferred embodiment, providing the fairing housing involves placing a raw component of a resin-containing fiber material in a mold, pre-curing or pre-compacting, and incorporating at least one stiffening component. Incorporating the stiffening component may involve shaping the at least one stiffening component in the raw component as well as the incorporation of a pre-cured or pre-compacted stiffening component. Joining the fairing housing, the at least one first cover panel, and the bridge element may involve inserting or placing these components into or onto the pre-cured or pre-compacted fairing housing as well as subsequent curing with an adhesive or resin present between the components. As an alternative to this, the fairing housing may also be fully cured, and the at least one first cover panel and the bridge element may subsequently be put into place and may be bonded or connected in a positive-locking, non-positive-locking, or integral manner.

BRIEF DESCRIPTION OF THE DRAWINGS

The various embodiments will hereinafter be described in conjunction with the following drawing figures, wherein like numerals denote like elements, and.

Further characteristics, advantages and application options of the present embodiment are disclosed in the following description of the exemplary embodiments and in the figures. All the described and/or illustrated characteristics per se and in any combination form the subject of the embodiment, even irrespective of their composition in the individual claims or their interrelationships. Furthermore, identical or similar components in the figures have the same reference characters.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1A:
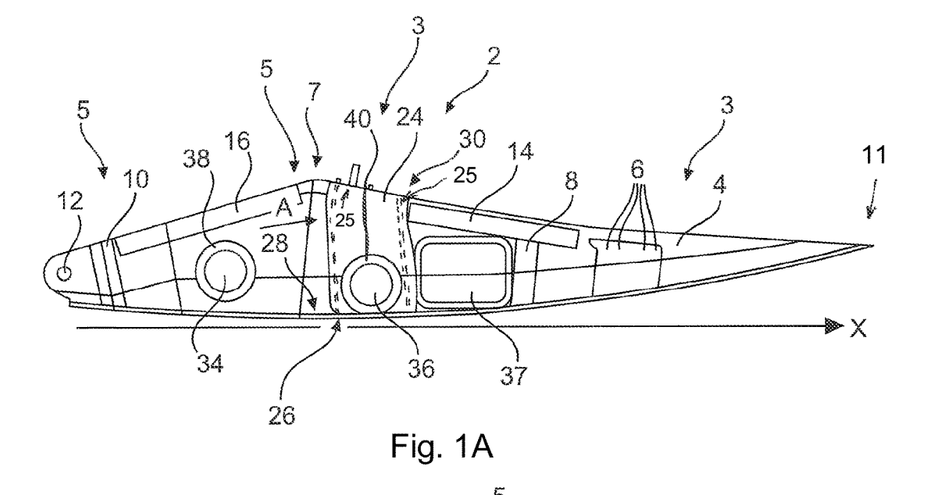
FIG. 1A shows a lateral view and an isometric view of a fairing element.
Figure 1B:
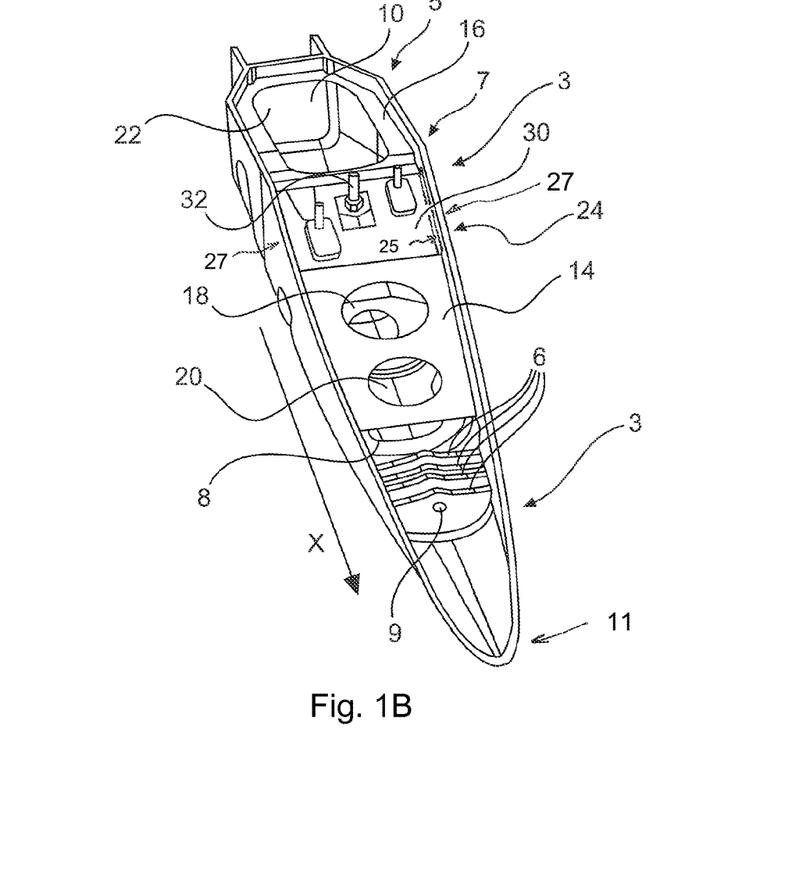
FIG. 1B shows a lateral view and an isometric view of a fairing element.

FIGS. 1A and 1B show a fairing element 2 for a flap adjustment mechanism (not shown in the diagrams) of an aircraft. The fairing element 2 comprises a shell-shaped fairing housing 4, which over a significant part along the direction of main extension (x) comprises a U-shaped profile that in the drawing plane is closed at the bottom and open at the top. Particularly preferably, the fairing housing 4 comprises a fiber composite material, for example CFRP. In this manner it is possible to achieve an aerodynamically very favorable profile without incurring an excessively laborious or costly manufacturing effort.

The fairing element 2, which comprises an adjustment mechanism and a flap driven by the aforesaid, is attachable, by way of a front section 3, to the underside of a wing. This front section is separated, by a kink 7, from a rear section 5 against which the driven flap may rest.

For the purpose of stiffening the fairing housing 4 a number of additional components are integrated in the fairing housing 4, for example the approximately half-moon-shaped ribs 6 in a region close to the leading edge 11 of the fairing element 2, which components, by means of holes 7 pointing towards the open side, may establish a redundant, secure mechanical connection with a main wing. Furthermore, as an example, a front frame element 8 and a rear frame element 10 are shown with an aperture 12 for an articulated connection to a further fairing element adjoining the rear frame element 10.

All of these additional elements are preferably made from the same material as the fairing housing 4 itself. It suggests itself, in particular, to manufacture the fairing housing 4, with the stiffening elements 6, 8 and 10 integrated therein, in such a manner that all the components cure together, thus forming one integral component. For example, the individual ribs 6 may be produced, pre-cured or pre-compacted from a resin-impregnated fiber fabric and may then be placed into a pre-compacted composite structure that will subsequently form the fairing housing 4. The same applies to the frame elements 8 and 10.

In order to further increase the rigidity, in particular the torsional rigidity on the direction of main extension (x), a first cover panel 14 and a second cover panel 16 are inserted as thrust plates on the open side of the fairing housing 4, where they are attached. Attachment may also take place by mutual curing if the cover panels 14 and 16 also comprise a fiber composite material. However, if these elements have been made from a metallic material, they may subsequently be bonded, screwed or riveted into place or may be arranged in such a manner in the curing process that during the curing process of the fairing housing 4 adhesion to the cover panels 14 and 16 takes place.

In particular in the case of manufacture from a metallic material the stiffening function of the cover panels 14 and 16 may also be achieved when the apertures 18, 20 and 22 are generous in size. The aforesaid support simplified installation and maintenance of the components to be integrated in the fairing element 2.

The so-called bridge element 24 is a central component that, for example, is arranged approximately in the middle of the fairing element 2, with the cover panels 14 and 16 adjoining the bridge element 24. The bridge element 24 has a shape that matches the shape of the fairing housing 4. This means that it has a U-shaped base area 26 that rests against an internal surface 28 of the fairing housing 4. The bridge element 24 extends to the open side of the fairing housing 4, where it comprises a planar cover area 30 that closes the bridge element 24. The bridge element 24 thus comprises a profile that is circumferential on the direction of main extension (x).

The bridge element 24 may comprise a connecting region 25 that corresponds to a connecting region 27 in the fairing housing 4. Merely as an example, an edge region on the open side of the fairing housing 4 and of a region corresponding to it is shown as connecting regions 25 and 27. However, it should be mentioned that in particular in the case of connections with mechanical connectors, for example rivets, one or several webs extending around the direction of extension (x) on the fairing housing 4 and on the bridge element 24 may be used as further connecting regions 25, 27.

The bridge element 24 is preferably made from a metallic material; it may, for example, be milled from a solid aluminum block, as an alternative to this it may also be manufactured component by component and may be connected, with the use of welded connections or riveted connections, to form a bridge element 24. As an alternative to this, a layer by layer design of a bridge element 24 comprising a more complex shape would also be possible, for example by means of an ALM method or an SLM method in that a metal powder is put in place and cured, and subsequently the resulting component is treated, for example in a heat treatment process.

It is the object, by means of the bridge element 24, to be able to provide a type of mechanical interface between the fairing housing 4, a wing, and the adjustment mechanism. On the bridge element 24 an adjustment mechanism may be held, wherein, moreover, on its cover panel 30 attachment of the fairing element 2 to a wing takes place.

For example, in the bridge element 24 an angle gear may be held that may be coupled, by way of a shaft feed-in 32, to a shaft of a central power control unit, (PCU). The angle gear may drive a spindle (not shown in FIGS. 1a and 1b) that engages a spindle nut in order to carry out a defined movement.

For maintenance, component exchange and component installation, several apertures 34 and 36 are arranged in the fairing housing 4, which apertures 34 and 36 are dimensioned in such a manner that a human hand and the components to be maintained may be fed through them. For example, the rear aperture 34 has a diameter of more than 10 cm, in particular 13 to 16 cm or more. The same applies to the middle aperture 36, which is furthermore aligned with an aperture in the base area 26 of the bridge element 24. For closing the apertures 34, 36, in particular screw-type covers are used that are preferably designed to be non-load-bearing and consequently are practically not subjected to mechanical loads.

Between the ribs 6 and the bridge element 24 on a lateral surface of the fairing housing 4 there is an additional aperture 37, in particular for the installation and maintenance of an actuator that may be arranged on the side of the bridge element 24, which side faces the ribs 6. As an example, in the illustration the aperture 37 is rectangular with rounded corners. This may, for example, make it possible to insert into the fairing housing 4 an actuator comprising a rectangular housing, and to attach the actuator in that location. In particular through the access opening 36, which is located beside the rectangular access opening 37, a hand may be inserted to support and guide the actuator.

For local reinforcement of the apertures 34 and 36, local, annular thickenings 38 or 40 are incorporated in the material of the fairing housing 4 so that the stress, which results in that location as a result of torsional forces or bending forces acting on the fairing housing 4, may be reduced. Furthermore, the thickenings may prevent mechanical loads acting on the covers of the apertures.

Figure 2:
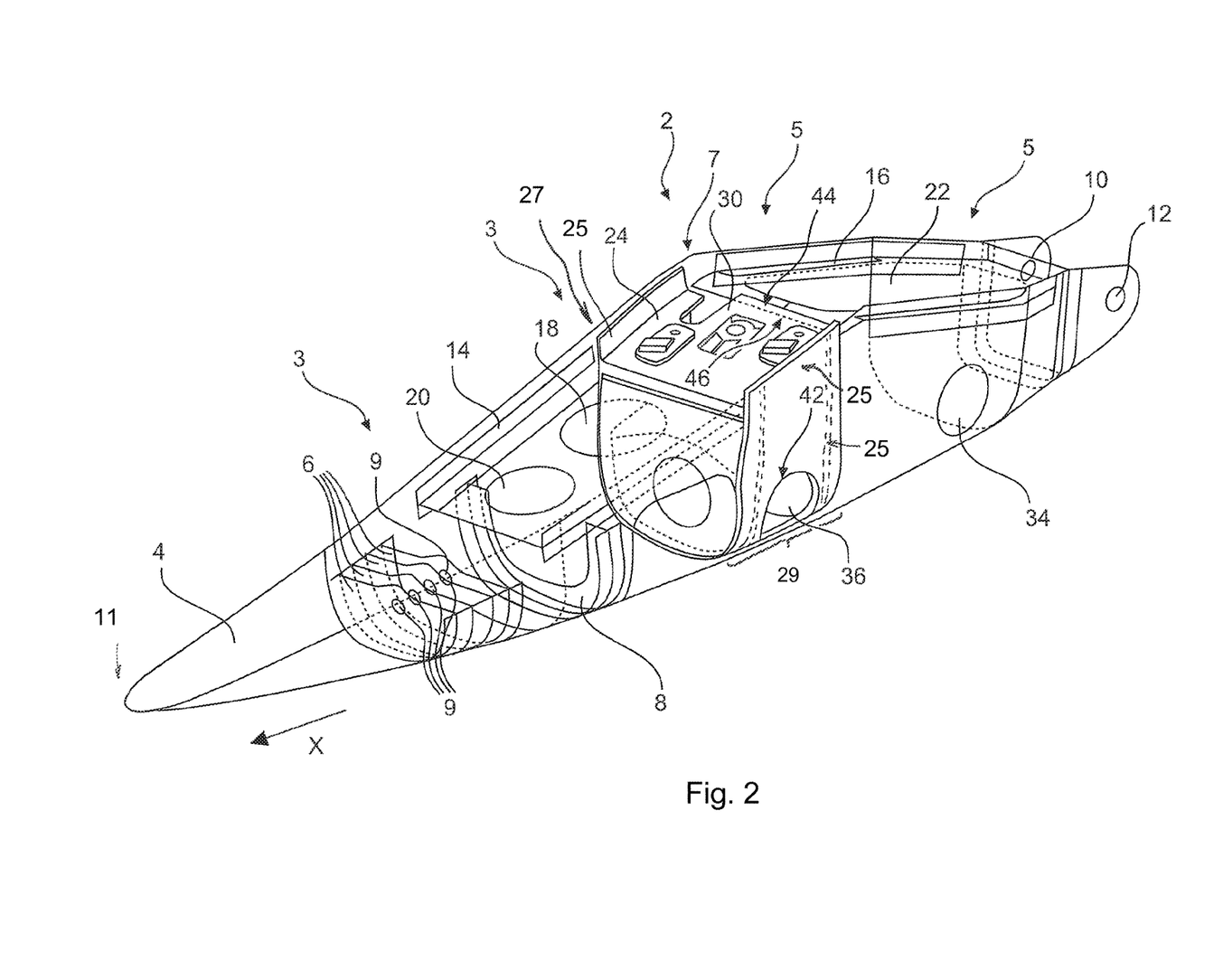
FIG. 2 shows a partly transparent view from a different angle of view of the fairing element.

In FIG. 2 the fairing element 2 is shown so as to be transparent in parts. This view shows an aperture 42 in the bridge element 24, which aperture 42 is aligned with the aperture 36 of the fairing housing 4. Furthermore, the illustration shows an overlap of an edge surface 44 of the second cover panel with an edge surface 46 of the bridge element 24. The same may be implemented in terms of the first cover panel 14. Moreover, the first cover panel 14 extends above the frame element 8 and, for example, does not establish contact with the frame element 8. The ribs 6, the frame element 8 and the frame element 10 form integral parts of the fairing housing 4. The fairing housing 4 may comprise a load introduction region 29, into which the bridge element 24 is installed to be integrally connected to the fairing housing.

Figure 3:
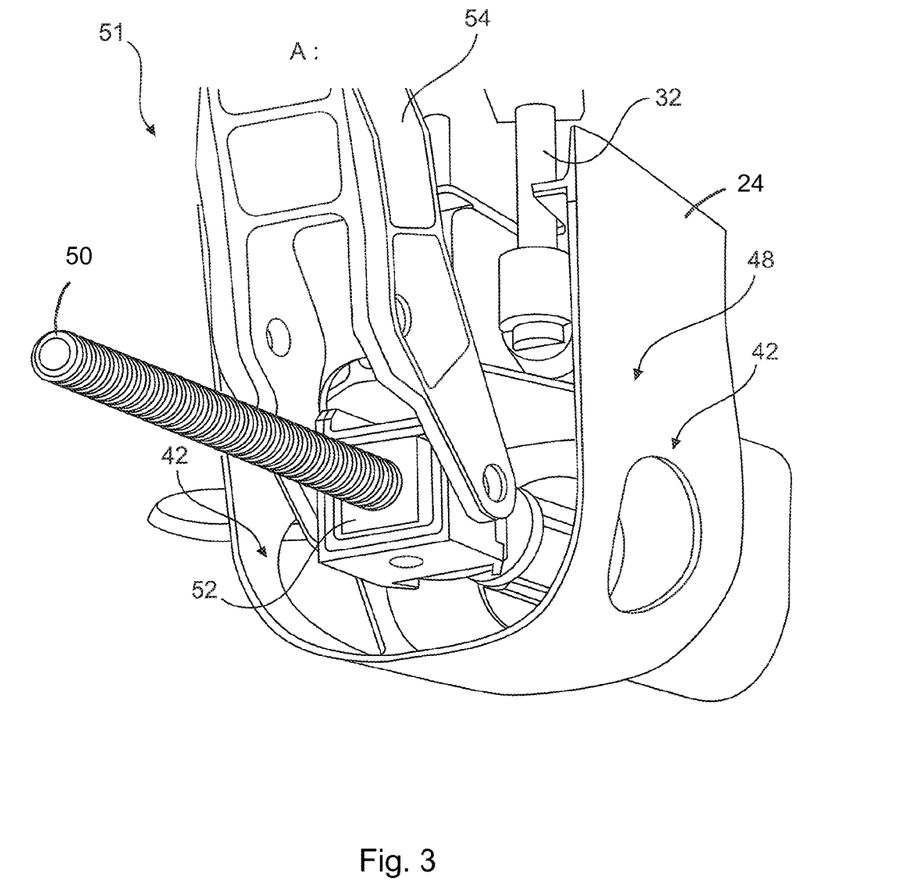
FIG. 3 shows an oblique front view of the bridge element with components of a flap adjustment mechanism installed therein.

Lastly, FIG. 3 shows a view A, designated "A" in FIG. 1a, with an adjustment mechanism 51 comprising an angle gear 48 that is integrated in the bridge element 24 and, by way of a shaft feed-in 32, may be coupled to a central flap drive. From the rotation of the shaft feed-in 32 the angle gear 48 may implement rotation of a threaded spindle 50 on that a threaded nut 52 is arranged. The latter acts on a lever 54 that is responsible for movement of a kinematic element coupled to it. Since the function of the fairing element 2 does not depend on the adjustment mechanism per se, no further details are shown in this context.

In summary, a particularly advantageous fairing element 2 for an adjustment mechanism on a wing of an aircraft results, which fairing element 2 is load-bearing, simple to manufacture and features light weight. The integration of a bridge element, to which the mechanical components are coupled, and to which also punctiform introductions of force are possible, introduces the resulting forces over a large area into the stiffened fairing housing 4.

In addition, it should be pointed out that "comprising" does not exclude other elements or steps, and "a" or "one" does not exclude a plural number. Furthermore, it should be pointed out that characteristics that have been described with reference to one of the above exemplary embodiments may also be used in combination with other characteristics of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A load-bearing fairing element for a flap adjustment mechanism of an aircraft, comprising:
   a shell-shaped fairing housing with a profile that is at least in a section U-shaped, the profile having an open side, a closed side, and a direction of main extension, and the fairing housing comprising a first access opening,
   at least one first cover panel that along the direction of main extension covers part of the open side, and
   a load-bearing bridge element comprising a second access opening,
   wherein the bridge element is positioned inside of, and contained within, the fairing housing, with a base area conformed so as to be flush against an internal surface of the fairing housing and extending towards the open side, and comprising an essentially planar cover that covers the base area on the open side in order to produce a closed circumferential profile contour relative to the direction of main extension, the cover of the bridge element positioned below an upper edge of the fairing housing,
   wherein the cover of the bridge element holds a shaft feed-in of a central flap drive such that the shaft feed-in extends through the cover of the bridge element and into an internal space of the bridge element, and wherein the bridge element holds an adjustment mechanism that is couplable to the shaft feed-in,
   wherein the first access opening of the fairing housing is aligned with the second access opening of the bridge element to provide access to the adjustment mechanism and components located within the bridge element, and
   wherein the bridge element is a multifunctional connecting link between a wing, the shaft feed-in, and the adjustment mechanism for a flap.

2. The fairing element of claim 1,
wherein the fairing housing is made from a fiber composite material and comprises at least one integral stiffening component.

3. The fairing element of claim 1,
wherein the fairing housing furthermore comprises at least one connection means that is designed to establish a mechanical connection with a wing.

4. The fairing element of claim 2,
wherein the fairing housing, in a region close to a leading edge of the fairing element, comprises a multitude of ribs that are spaced apart from each other, which ribs are arranged transversely to the direction of main extension.

5. The fairing element of claim 1,
wherein the fairing housing on an internal surface comprises a load introduction region in which the bridge element is integrally connected to the fairing housing.

6. The fairing element of claim 5,
wherein the load introduction region is delimited in at least one direction along the direction of main extension by means of at least one flat flange.

7. The fairing element of claim 1,
wherein the bridge element comprises at least one connecting region that corresponds to a connecting region of the fairing housing, and the bridge element is connected to the fairing housing by means of positive-locking or non-positive-locking connecting elements at least in the connecting regions.

8. The fairing element of claim 1,
wherein the bridge element has been manufactured from a metallic material.

9. The fairing element of claim 1,
further comprising a second cover panel, arranged along the direction of main extension on an end of the bridge element, which end is opposite the first cover panel.

10. The fairing element of claim 1,
wherein the first and second access openings are dimensioned in such a manner that a human hand can reach through the first and second access openings into the interior of the fairing housing.

11. The fairing element of claim 10,
wherein on each of two lateral surfaces the fairing element comprises at least one access opening.

12. The fairing element of claim 10,
wherein at least one of the at least one access opening comprises an annular thickening on the edge.

13. The fairing element of claim 10,
wherein the bridge element comprises an annular thickening in a region in which at least one of the at least one access opening of the fairing housing is situated.

14. An aircraft, comprising:
a wing; and
at least one flap arranged so as to be movable relative to the wing;
a load-bearing fairing element attached to the wing; and
at least one adjustment mechanism arranged in the fairing element, the fairing element comprising:
- a shell-shaped fairing housing with a profile that is at least in a section U-shaped, the profile having an open side, a closed side, and a direction of main extension, and the fairing housing comprising a first access opening,
- at least one first cover panel that along the direction of main extension covers part of the open side, and
- a load-bearing bridge element as a central load introduction element for the flap adjustment mechanism, the bridge element comprising a second access opening,
wherein the bridge element is positioned inside of, and contained within, the fairing housing, with a base area conformed so as to be flush against an internal surface of the fairing housing and extending towards the open side, and comprising an essentially planar cover that covers the base area on the open side in order to produce a closed circumferential profile contour relative to the direction of main extension, the cover of the bridge element positioned below an upper edge of the fairing housing,
wherein the cover of the bridge element holds a shaft feed-in of a central flap drive such that the shaft feed-in extends through the cover of the bridge element and into an internal space of the bridge element, and wherein the bridge element holds an adjustment mechanism that is couplable to the shaft feed-in, and
wherein the first access opening of the fairing housing is aligned with the second access opening of the bridge element to provide access to the adjustment mechanism and components located within the bridge element.

* * * * *